US012739894B2

(12) United States Patent
Kim

(10) Patent No.: US 12,739,894 B2
(45) Date of Patent: Sep. 15, 2026

(54) METHOD AND DEVICE FOR SAVING POWER IN A COMMUNICATION SYSTEM SUPPORTING MULTIPLE LINKS

(71) Applicants: HYUNDAI MOTOR COMPANY, Seoul (KR); KIA CORPORATION, Seoul (KR); KOREA NATIONAL UNIVERSITY OF TRANSPORTATION INDUSTRY-ACADEMIC COOPERATION FOUNDATION, Chungju-si (KR)

(72) Inventor: Yong Ho Kim, Incheon (KR)

(73) Assignees: HYUNDAI MOTOR COMPANY, Seoul (KR); KIA CORPORATION, Seoul (KR); KOREA NATIONAL UNIVERSITY OF TRANSPORTATION INDUSTRY-ACADEMIC COOPERATION FOUNDATION, Chungju-si (KR)

( * ) Notice: Subject to any disclaimer, the term of this patent is extended or adjusted under 35 U.S.C. 154(b) by 498 days.

(21) Appl. No.: 18/021,696

(22) PCT Filed: Aug. 18, 2021

(86) PCT No.: PCT/KR2021/010932
§ 371 (c)(1),
(2) Date: Feb. 16, 2023

(87) PCT Pub. No.: WO2022/039482
PCT Pub. Date: Feb. 24, 2022

(65) Prior Publication Data

US 2024/0040634 A1 Feb. 1, 2024

(30) Foreign Application Priority Data

Aug. 19, 2020 (KR) ........................ 10-2020-0104163
Aug. 18, 2021 (KR) ........................ 10-2021-0108454

(51) Int. Cl.
*H04W 74/0833* (2024.01)
*H04W 76/15* (2018.01)

(52) U.S. Cl.
CPC ......... *H04W 74/085* (2013.01); *H04W 76/15* (2018.02)

(58) Field of Classification Search
CPC ... H04W 74/085; H04W 76/15; H04W 48/14; H04W 52/0248; H04W 52/0216; H04W 74/002; H04W 84/12; Y02D 30/70
See application file for complete search history.

(56) References Cited

U.S. PATENT DOCUMENTS 9,344,963 B2 5/2016 Seok
9,877,276 B2 1/2018 Seok
(Continued)

FOREIGN PATENT DOCUMENTS

CN 111345063 A 6/2020
KR 20140056181 A 5/2014
(Continued)

OTHER PUBLICATIONS

International Search Report and Written Opinion cited in corresponding application No. PCT/KR2020/010932; Nov. 12, 2021; 10pp.
(Continued)

*Primary Examiner* — Sudesh M. Patidar
(74) *Attorney, Agent, or Firm* — Lempia Summerfield Katz LLC

(57) ABSTRACT

Disclosed are a method and a device for saving power in a communication system supporting multiple links. An opera-
(Continued)

tion method of a first station (STA) affiliated with a first device comprises: transmitting, to a first access point (AP) affiliated with a second device, a first frame which requests configuration of one or more target wake time (TWT) service periods (SPs) for multiple links including a first link and a second link being in a non-simultaneous transmit and receive (NSTR) relationship; and receiving, from the first AP, a second frame including configuration information of the one or more TWT SPs, wherein the one or more TWT SPs in the first link and the one or more TWT SPs in the second link are identically configured.

9 Claims, 10 Drawing Sheets

(56) References Cited

U.S. PATENT DOCUMENTS

| | | | | |
|---|---|---|---|---|
| 11,032,207 | B2 | 6/2021 | Patil et al. | |
| 11,160,112 | B2 | 10/2021 | Wang et al. | |
| 11,503,539 | B2 | 11/2022 | Kim et al. | |
| 11,716,682 | B2 | 8/2023 | Kim et al. | |
| 2015/0036572 | A1 | 2/2015 | Seok | |
| 2015/0173012 | A1 | 6/2015 | Seok | |
| 2018/0206190 | A1* | 7/2018 | Cherian | H04L 1/1621 |
| 2018/0206284 | A1 | 7/2018 | Zhou et al. | |
| 2018/0302930 | A1 | 10/2018 | Wang et al. | |
| 2019/0158385 | A1 | 5/2019 | Patil | |
| 2019/0158413 | A1 | 5/2019 | Patil et al. | |
| 2019/0239226 | A1 | 8/2019 | Chu et al. | |
| 2019/0274147 | A1 | 9/2019 | Yang et al. | |
| 2020/0267644 | A1* | 8/2020 | Rajib | H04W 52/0216 |
| 2021/0007168 | A1* | 1/2021 | Asterjadhi | H04W 52/0235 |
| 2021/0329547 | A1 | 10/2021 | Kim et al. | |
| 2022/0046719 | A1 | 2/2022 | Wang et al. | |
| 2022/0225236 | A1* | 7/2022 | Bang | H04W 52/0248 |
| 2023/0036941 | A1 | 2/2023 | Kim | |
| 2023/0082270 | A1* | 3/2023 | Guo | H04W 4/06<br>370/329 |
| 2023/0269683 | A1* | 8/2023 | Kishida | H04W 52/0216<br>370/503 |
| 2023/0344564 | A1* | 10/2023 | Wang | H04W 52/0219 |
| 2023/0345366 | A1* | 10/2023 | Shafin | H04W 52/0216 |

FOREIGN PATENT DOCUMENTS

| | | | |
|---|---|---|---|
| KR | 20180086414 | A | 7/2018 |
| WO | 2018095241 | A1 | 5/2018 |
| WO | 2020040587 | A1 | 2/2020 |

OTHER PUBLICATIONS

Jeongki Kim et al., EHT Power saving considering multi-link, IEEE 802.11-19/1510r6, LG Electronics; 2019; 17 pp.

Ming Gan, et al., Power Save for Multi-link, IEEE 802.11-19/1988-03-00be; 2019; 17pp.

* cited by examiner

FIG. 1

METHOD AND DEVICE FOR SAVING POWER IN A COMMUNICATION SYSTEM SUPPORTING MULTIPLE LINKS

CROSS-REFERENCE TO RELATED APPLICATIONS

This application is a U.S. national stage of International Application No. PCT/KR2021/010932, filed on Aug. 18, 2021, which claims priority to Korean Patent Application No. 10-2020-0104163, filed on Aug. 19, 2020, and Korean Patent Application No. 10-2021-0108454, filed on Aug. 18, 2021, the entire disclosures of each of which are incorporated herein by reference.

TECHNICAL FIELD

The present disclosure relates to a wireless local area network (LAN) communication technique, and more particularly, to a low-power operation technique in a communication system supporting multiple links.

BACKGROUND

Recently, as the spread of mobile devices expands, a wireless local area network technology capable of providing fast wireless communication services to mobile devices is in the spotlight. The wireless local area network (LAN) technology may be a technology that supports mobile devices such as smart phones, smart pads, laptop computers, portable multimedia players, embedded devices, and the like to wirelessly access the Internet based on wireless communication technology.

The standards using the wireless LAN technology are being standardized as IEEE802.11 standards mainly in the Institute of Electrical and Electronics Engineers (IEEE). As the above-described wireless LAN technologies have been developed and spread, applications using the wireless LAN technologies have been diversified, and a demand for a wireless LAN technology supporting a higher throughput has arisen. Accordingly, a frequency bandwidth (e.g., 'maximum 160 MHz bandwidth' or '80+80 MHz bandwidth') used in the IEEE 802.11ac standard has been expanded, and the number of supported spatial streams has also increased. The IEEE 802.11ac standard may be a very high throughput (VHT) wireless LAN technology supporting a high throughput of 1 gigabit per second (Gbps) or more. The IEEE 802.11ac standard can support downlink transmission for multiple stations by utilizing the MIMO techniques.

As applications requiring higher throughput and applications requiring real-time transmission occur, the IEEE 802.11be standard, which is an extreme high throughput (EHT) wireless LAN technology, is being developed. The goal of the IEEE 802.11be standard may be to support a high throughput of 30 Gbps. The IEEE 802.11be standard may support techniques for reducing a transmission latency. In addition, the IEEE 802.11be standard can support a more expanded frequency bandwidth (e.g., 320 MHz bandwidth), multi-link transmission and aggregation operations including multi-band operations, multiple access point (AP) transmission operations, and/or efficient retransmission operations (e.g., hybrid automatic repeat request (HARQ) operations).

However, since multi-link operations are operations not defined in the existing wireless LAN standard, it may be necessary to define detailed operations according to an environment in which the multi-link operations are performed. In particular, methods for supporting low-power operations in a multi-link environment are required.

Meanwhile, the technologies that are the background of the present disclosure are written to improve the understanding of the background of the present disclosure and may include content that is not already known to those of ordinary skill in the art to which the present disclosure belongs.

SUMMARY

Technical Problem

The present disclosure is directed to providing a method and an apparatus for low-power operations in a communication system supporting multiple links.

Technical Solution

An operation method of a first station (STA) included in a first device, according to a first embodiment of the present disclosure for achieving the above-described objective, may comprise transmitting, to a first access point (AP) included in a second device, a first frame requesting configuration of one or more target wake time (TWT) service periods (SPs) for the multi-link including a first link and a second link having a non-simultaneous transmit and receive (NSTR) relationship. The operation method may further comprise receiving, from the first AP, a second frame including configuration information of the one or more TWT SPs. The one or more TWT SPs in the first link and the one or more TWT SPs in the second link are identically configured.

The operation method may further comprise performing a monitoring operation for a trigger frame within a TWT SP #n of the first link among the one or more TWT SPs. The operation method may further comprise in response to receiving the trigger frame from the first AP, transmitting a response frame to the first AP within the TWT SP #n of the first link. The operation method may further comprise receiving a data frame from the first AP within the TWT SP #n of the first link, wherein n is a natural number.

The operation method may further comprise receiving a beacon frame from the first AP in the first link. When the beacon frame indicates that data to be transmitted to the first STA exists, the monitoring operation for the trigger frame may be performed within the TWT SP #n.

The operation method may further comprise in response to that a state of the TWT SP #n of the first link is in a busy state, performing a monitoring operation for a trigger frame within a TWT SP #n+1 after the TWT SP #n among the one or more TWT SPs of the first link.

The monitoring operation for the trigger frame may be performed when a state of the TWT SP #n or a time period before T0 from a start time point of the TWT SP #n is an idle state.

An operation state of the first STA may transition from a sleep state to an awake state at or before a start time point of the TWT SP #n.

The response frame may be a power saving (PS)-Poll frame, an unscheduled-automatic power save delivery (U-APSD) frame, or a Quality-of-Service (QoS) null frame.

The operation method may further comprise: transmitting, to the first AP and in the first link, an association request frame including information indicating whether a low-power operation is supported. The operation method may further comprise receiving an association response frame from the first AP in the first link in response to the association request frame.

The association response frame may include an association identification (AID) configured for each device.

An operation method of a first device, according to a second embodiment of the present disclosure for achieving the above-described objective, may comprise configuring a target wake time (TWT) service period (SP) with a second device in a first link of the multi-link. The operation method may further comprise identifying a state of the multi-link during a time period before T0 from a start time point of the TWT SP. The operation method may further comprise in response to identifying that a second link of the multi-link is in an idle state, performing a monitoring operation for a trigger frame within the TWT SP of the second link. The operation method may further comprise in response to receiving the trigger frame from the second device, transmitting a response frame to the second device within the TWT SP of the second link. The operation method may further comprise receiving a data frame from the second device within the TWT SP of the second link.

The configuring of the TWT SP may comprise transmitting a multi-link (ML) TWT request frame to a first access point (AP) included in the second device in the first link. The configuring of the TWT SP may further comprise receiving an ML TWT response frame, which is a response to the ML TWT request frame, from the first AP in the first link. The configuration information of the TWT SP is included in the ML TWT response frame.

The operation method may further comprise receiving a beacon frame from a first AP included in the second device in the first link. When the beacon frame indicates that data to be transmitted to the first STA included in the first device exists, the monitoring operation for the trigger frame may be performed within the TWT SP.

All STAs included in the first device may operate in an awake state during a time period before T0 from a start time point of the TWT SP, and an operation state of a STA operating in a link determined to be in a busy state during the time period may transition to a sleep state.

T0 may be set to a time within a sum of a distributed coordination function (DCF) interframe space (DIFS) and a maximum value of a backoff counter.

An operation method of a first device, according to a third embodiment of the present disclosure for achieving the above-described objective, may comprise configuring a target wake time (TWT) service period (SP) with a second device in a first link of the multi-link. The operation method may further comprise identifying a state of a first link of the multi-link during a first T1 period from a start time point of the TWT SP. The operation method may further comprise in response to identifying that the first link is in a busy state, identifying a state of a second link of the multi-link during a second T1 period from an end time point of the first T1 period. The operation method may further comprise in response to identifying that the second link is in an idle state, performing a monitoring operation for a trigger frame within the TWT SP of the second link. The operation method may further comprise in response to receiving the trigger frame from the second device, transmitting a response frame to the second device within the TWT SP of the second link. The operation method may further comprise receiving a data frame from the second device within the TWT SP of the second link.

A length of the TWT SP may be increased by the first T1 period.

In response to that a state of the first link is changed from the busy state to an idle state during the first T1 period, the state of the first link may be additionally identified during a T2 period.

The configuring of the TWT SP may comprise transmitting a multi-link (ML) TWT request frame to a first AP affiliated with the second device in the first link. The configuring of the TWT SP may further comprise receiving an ML TWT response frame, which is a response to the ML TWT request frame, from the first AP in the first link. Configuration information of the TWT SP is included in the ML TWT response frame.

The operation method may further comprise receiving a beacon frame from a first AP affiliated with the second device in the first link. When the beacon frame indicates that data to be transmitted to the first STA affiliated with the first device exists, the monitoring operation for the trigger frame may be performed within the TWT SP.

T1 may be set to a time within a sum of a distributed coordination function (DCF) interframe space (DIFS) and a maximum value of a backoff counter.

Advantageous Effects

According to the present disclosure, in communication using a multi-link, transmission and reception of a data frame may be performed by trigger frame transmission of one communication node (e.g., access point (AP), station (STA), multi-link device (MLD)) at a time when communication can be performed. Therefore, occurrence of a communication error can be prevented in a situation where simultaneous transmit and receive (STR) is impossible, and data can be quickly transmitted even when a communication node performs a low-power operation or when a limited low-power operation is performed in the multi-link.

DESCRIPTION OF DRAWINGS

FIG. 1 is a block diagram illustrating a first embodiment of a communication node constituting a wireless local area network (LAN) system.

DETAILED DESCRIPTION

Figure 2:
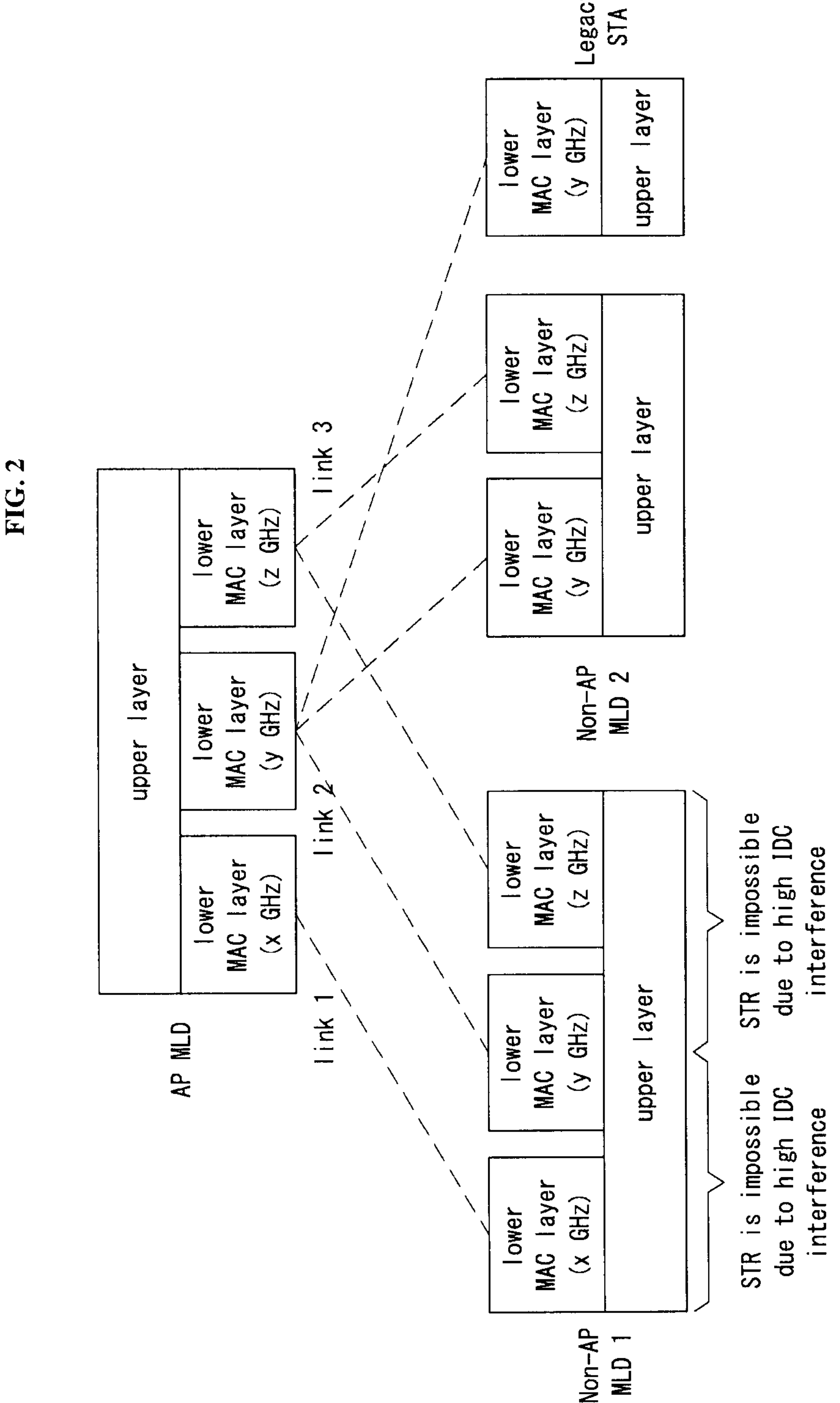
FIG. 2 is a conceptual diagram illustrating a first embodiment of multi-links configured between multi-link devices (MLDs).

Since the present disclosure may be variously modified and may have several forms, specific embodiments are shown in the accompanying drawings and be described in detail in the detailed description. It should be understood, however, that it is not intended to limit the present disclosure to the specific embodiments. On the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named as a second component without departing from the scope of the present disclosure, and the second component may also be similarly named as the first component. The term "and/or" means any one or a combination of a plurality of related and described items.

In embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it should be understood that a further component is not disposed therebetween.

The terms used in the present disclosure are only used to describe specific embodiments and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists. However, it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings consistent with contextual meanings in the art. In this description, unless defined clearly, terms are not necessarily construed as having formal meanings.

Hereinafter, forms of the present disclosure are described in detail with reference to the accompanying drawings. In describing the disclosure, to facilitate the entire understanding of the disclosure, like numbers refer to like elements throughout the description of the figures and the repetitive description thereof has been omitted.

In the following, a wireless communication system to which embodiments according to the present disclosure are applied is described. The wireless communication system to which the embodiments according to the present disclosure are applied is not limited to the contents described below, and the embodiments according to the present disclosure can be applied to various wireless communication systems. A wireless communication system may be referred to as a 'wireless communication network'.

Figure 1:
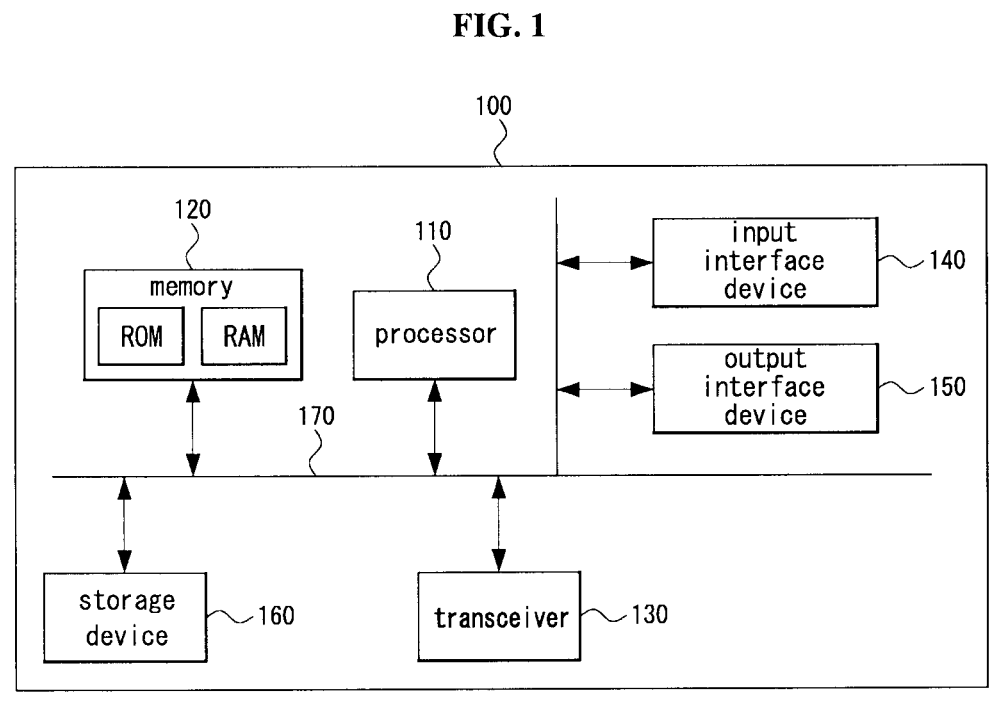

FIG. 1 is a block diagram illustrating a first embodiment of a communication node constituting a wireless LAN system.

As shown in FIG. 1, a communication node 100 may be an access point, a station, an access point (AP) multi-link device (MLD), or a non-AP MLD. The access point may refer to an AP, and the station may refer to a STA or a non-AP STA. The operating channel width supported by the access point may be 20 megahertz (MHz), MHz, 160 MHz, or the like. The operating channel width supported by the station may be 20 MHz, 80 MHz, or the like.

The communication node 100 may include at least one processor 110, a memory 120, and a plurality of transceivers 130 connected to a network to perform communications. The transceiver 130 may be referred to as a transceiver, a radio frequency (RF) unit, an RF module, or the like. In addition, the communication node 100 may further include an input interface device 140, an output interface device 150, a storage device 160, and the like. The components included in the communication node 100 may be connected by a bus 170 to communicate with each other.

However, the respective components included in the communication node 100 may be connected through individual interfaces or individual buses centering on the processor 110 instead of the common bus 170. For example, the processor 110 may be connected to at least one of the memory 120, the transceiver 130, the input interface device 140, the output interface device 150, or the storage device 160 through a dedicated interface.

The processor 110 may execute at least one instruction stored in at least one of the memory 120 or the storage device 160. The processor 110 may refer to a central processing unit (CPU), a graphics processing unit (GPU), or a dedicated processor on which the methods according to the embodiments of the present invention are performed. Each of the memory 120 and the storage device 160 may be configured as at least one of a volatile storage medium or a nonvolatile storage medium. For example, the memory 120 may be configured with at least one of a read only memory (ROM) or a random access memory (RAM).

FIG. 2 is a conceptual diagram illustrating a first embodiment of multi-links configured between MLDs.

As shown in FIG. 2, an MLD may have one medium access control (MAC) address. In embodiments, the MLD may mean an AP MLD and/or non-AP MLD. The MAC address of the MLD may be used in a multi-link setup procedure between the non-AP MLD and the AP MLD. The MAC address of the AP MLD may be different from the MAC address of the non-AP MLD. AP(s) affiliated with the AP MLD may have different MAC addresses, and station(s) (STA(s)) affiliated with the non-AP MLD may have different MAC addresses. Each of the APs having different MAC addresses may be in charge of each link among multiple links supported by the AP MLD and may perform a role of an independent AP.

Each of the STAs having different MAC addresses may be in charge of each link among multiple links supported by the non-AP MLD, and may perform a role of an independent STA. The non-AP MLD may be referred to as a STA MLD. The MLD may support a simultaneous transmit and receive (STR) operation. In this case, the MLD may perform a transmission operation in a link 1 and may perform a reception operation in a link 2. The MLD supporting the STR operation may be referred to as an STR MLD (e.g., STR AP MLD, STR non-AP MLD). In embodiments, a link may mean a channel or a band. A device that does not support the STR operation may be referred to as a non-STR (NSTR) AP MLD or an NSTR non-AP MLD (or NSTR STA MLD).

The MLD may transmit and receive frames in multiple links (i.e., multi-link) by using a non-contiguous bandwidth extension scheme (e.g., 80 MHz+80 MHz). The multi-link operation may include multi-band transmission. The AP MLD may include a plurality of APs, and the plurality of APs may operate in different links. Each of the plurality of APs may perform function(s) of a lower MAC layer. Each of the plurality of APs may be referred to as a 'communication node' or 'lower entity'. The communication node (i.e., AP) may operate under control of an upper layer (or the processor 110 shown in FIG. 1). The non-AP MLD may include a plurality of STAs, and the plurality of STAs may operate in different links. Each of the plurality of STAs may be referred to as a 'communication node' or 'lower entity'. The communication node (i.e., STA) may operate under control of an upper layer (or the processor 110 shown in FIG. 1).

The MLD may perform communications in multiple bands (i.e., multi-band). For example, the MLD may perform communications using an 80 MHz bandwidth according to a channel expansion scheme (e.g., bandwidth expansion scheme) in a 2.4 GHz band and may perform communications using a 160 MHz bandwidth according to a channel expansion scheme in a 5 GHz band. The MLD may perform communications using a 160 MHz bandwidth in the 5 GHz band and may perform communications using a 160 MHz bandwidth in a 6 GHz band. One frequency band (e.g., one channel) used by the MLD may be defined as one link. Alternatively, a plurality of links may be configured in one frequency band used by the MLD. For example, the MLD may configure one link in the 2.4 GHz band and two links in the 6 GHz band. The respective links may be referred to as a first link, a second link, and a third link. Alternatively, the respective links may be referred to as a link 1, a link 2, and a link 3. A link number may be set by the AP, and an identifier (ID) may be assigned to each link.

The MLD (e.g., AP MLD and/or non-AP MLD) may configure a multi-link by performing an access procedure and/or a negotiation procedure for a multi-link operation. In this case, the number of links and/or link(s) to be used in the multi-link may be configured. The non-AP MLD (e.g., STA) may identify information on band(s) capable of communicating with the AP MLD. In the negotiation procedure for a multi-link operation between the non-AP MLD and the AP MLD, the non-AP MLD may configure one or more links among links supported by the AP MLD to be used for the multi-link operation. A station that does not support a multi-link operation (e.g., IEEE 802.11a/b/g/n/ac/ax STA) may be connected to one or more links of the multi-link supported by the AP MLD.

When a band separation between multiple links (e.g., a band separation between the link 1 and the link 2 in the frequency domain) is sufficient, the MLD may perform an STR operation. For example, the MLD may transmit a physical layer convergence procedure (PLCP) protocol data unit (PPDU) 1 using the link 1 among multiple links and may receive a PPDU 2 using the link 2 among multiple links. On the other hand, if the MLD performs the STR operation when the band separation between multiple links is insufficient, in-device coexistence (IDC) interference, which is interference between the multiple links, may occur. Therefore, a link pair with insufficient band separation between multiple links may be a non-STR link pair, and the MLD may operate as a non-STR MLD (e.g., non-STR non-AP (STA) MLD or non-STR AP MLD) that is not capable of STR operations. The AP included in the non-STR AP MLD may be a soft AP. The embodiments below may be performed by the AP (e.g., AP included in the STR AP MLD) as well as a soft AP (e.g., AP included in the non-STR AP MLD).

For example, a multi-link including a link 1, a link 2, and a link 3 may be configured between the AP MLD and the non-AP MLD 1. If the band separation between the link 1 and the link 3 is sufficient, the AP MLD may perform an STR operation using the link 1 and the link 3. In other words, the AP MLD may transmit a frame using the link 1 and may receive a frame using the link 3. If the band separation between the link 1 and the link 2 is not sufficient, the link 1 and the link 2 may be a non-STR link pair, and the AP MLD or STA MLD may not be able to perform an STR operation using the link 1 and the link 2. If the band separation between the links 2 and 3 is not sufficient, the AP MLD or the STA MLD may not be able to perform an STR operation using the link 2 and 3.

Meanwhile, in a wireless LAN system, a negotiation procedure for a multi-link operation may be performed in an access procedure between a STA and an AP.

A device (e.g., AP or STA) supporting a multi-link may be referred to as a multi-link device (MLD). An AP supporting a multi-link may be referred to as an AP MLD, and a STA supporting a multi-link may be referred to as a non-AP MLD or STA MLD. The AP MLD may have a physical address (e.g., MAC address) for each link. The AP MLD may be implemented as if an AP in charge of each link exists separately. A plurality of APs may be managed within one AP MLD. Accordingly, coordination between the plurality of APs belonging to the same AP MLD may be possible. The STA MLD may have a physical address (e.g., MAC address) for each link. The STA MLD may be implemented as if an STA in charge of each link exists separately. A plurality of STAs may be managed within one STA MLD. Accordingly, coordination between the plurality of STAs belonging to the same STA MLD may be possible.

For example, an AP1 of the AP MLD and a STA1 of the STA MLD may each be in charge of a first link and may communicate using the first link. An AP2 of the AP MLD and a STA2 of the STA MLD may each be in charge of a second link, and may communicate using the second link. The STA2 may receive state change information for the first link in the second link. In this case, the STA MLD may collect information (e.g., state change information) received from each link, and may control operations performed by the STA1 based on the collected information.

Figure 3:
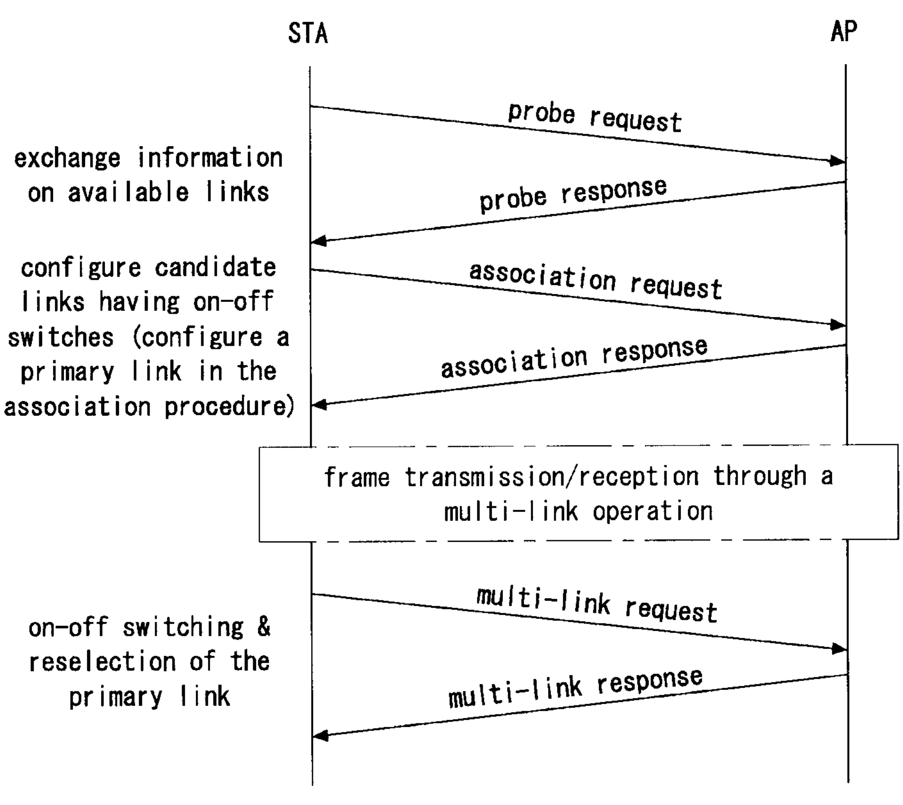
FIG. 3 is a sequence chart illustrating a first embodiment of a negotiation procedure for a multi-link operation in a wireless LAN system.

FIG. 3 is a sequence chart illustrating a first embodiment of a negotiation procedure for a multi-link operation in a wireless LAN system.

As shown in FIG. 3 an access procedure between an STA and an AP in an infrastructure basic service set (BSS) may generally be divided into a probe step of probing AP(s), an authentication step for authentication between the STA and the probed AP, and an association step of association between the STA and the authenticated AP.

In the probe step, the STA may detect one or more APs using a passive scanning scheme or an active scanning scheme. When the passive scanning scheme is used, the STA may detect one or more APs by overhearing beacons transmitted by the one or more APs. When the active scanning scheme is used, the STA may transmit a probe request frame and may detect one or more APs by receiving probe response frames that are responses to the probe request frame from the one or more APs.

When the one or more APs are detected, the STA may perform an authentication step with the detected AP(s). In this case, the STA may perform the authentication step with a plurality of APs. An authentication algorithm according to the IEEE 802.11 standard may be classified into an open system algorithm of exchanging two authentication frames, a shared key algorithm of exchanging four authentication frames, and the like.

The STA may transmit an authentication request frame based on the authentication algorithm according to the IEEE 802.11 standard and may complete authentication with the AP by receiving an authentication response frame that is a response to the authentication request frame from the AP.

When the authentication with the AP is completed, the STA may perform an association step with the AP. In particular, the STA may select one AP among AP(s) with which the STA has performed the authentication step and may perform the association step with the selected AP. In other words, the STA may transmit an association request frame to the selected AP and may complete the association with the AP by receiving an association response frame that is a response to the association request frame from the selected AP.

Meanwhile, a multi-link operation may be supported in the wireless LAN system. A multi-link device (MLD) may include one or more STAs affiliated with the MLD. The MLD may be a logical entity. The MLD may be classified into an AP MLD and a non-AP MLD. Each STA affiliated with the AP MLD may be an AP, and each STA affiliated with the non-AP MLD may be a non-AP STA. In order to configure a multi-link, a multi-link discovery procedure, a multi-link setup procedure, and the like may be performed. The multi-link discovery procedure may be performed in the probe step between an STA and an AP. In this case, multi-link information elements (ML IEs) may be included in the beacon frame, the probe request frame, and/or the probe response frame.

For example, in order to perform a multi-link operation, in the probe step, the AP (e.g., AP affiliated with an MLD) may exchange information indicating whether the multi-link operation can be used and information on available link(s) with the STA (e.g., non-AP STA affiliated with an MLD). In a negotiation procedure for the multi-link operation (e.g., multi-link setup procedure), the STA may transmit information of link(s) to be used for the multi-link operation. The negotiation procedure for the multi-link operation may be performed in the access procedure (e.g., association step) between the STA and the AP. Also, information element(s) required for the multi-link operation may be configured or changed by an action frame in the negotiation procedure.

In addition, in the access procedure (e.g., association step) between the STA and the AP, available link(s) of the AP may be configured, and an identifier (ID) may be assigned to each link. Thereafter, in the negotiation procedure and/or change procedure for the multi-link operation, information indicating whether each link is activated may be transmitted, and the information may be expressed using the link ID(s).

The information indicating whether the multi-link operation can be used may be transmitted and received in a procedure of exchanging capability information element(s) (e.g., EHT capability information element(s)) between the STA and the AP. The capability information element(s) may include information of supporting band(s), information of supporting link(s) (e.g., ID(s) and/or number of supporting link(s)), information of links capable of simultaneous transmission and reception (STR) operations (e.g., information on bands of the links, information on a separation between the links), and/or the like. In addition, the capability information element(s) may include information that individually indicates a link capable of the STR operation.

Figure 4:
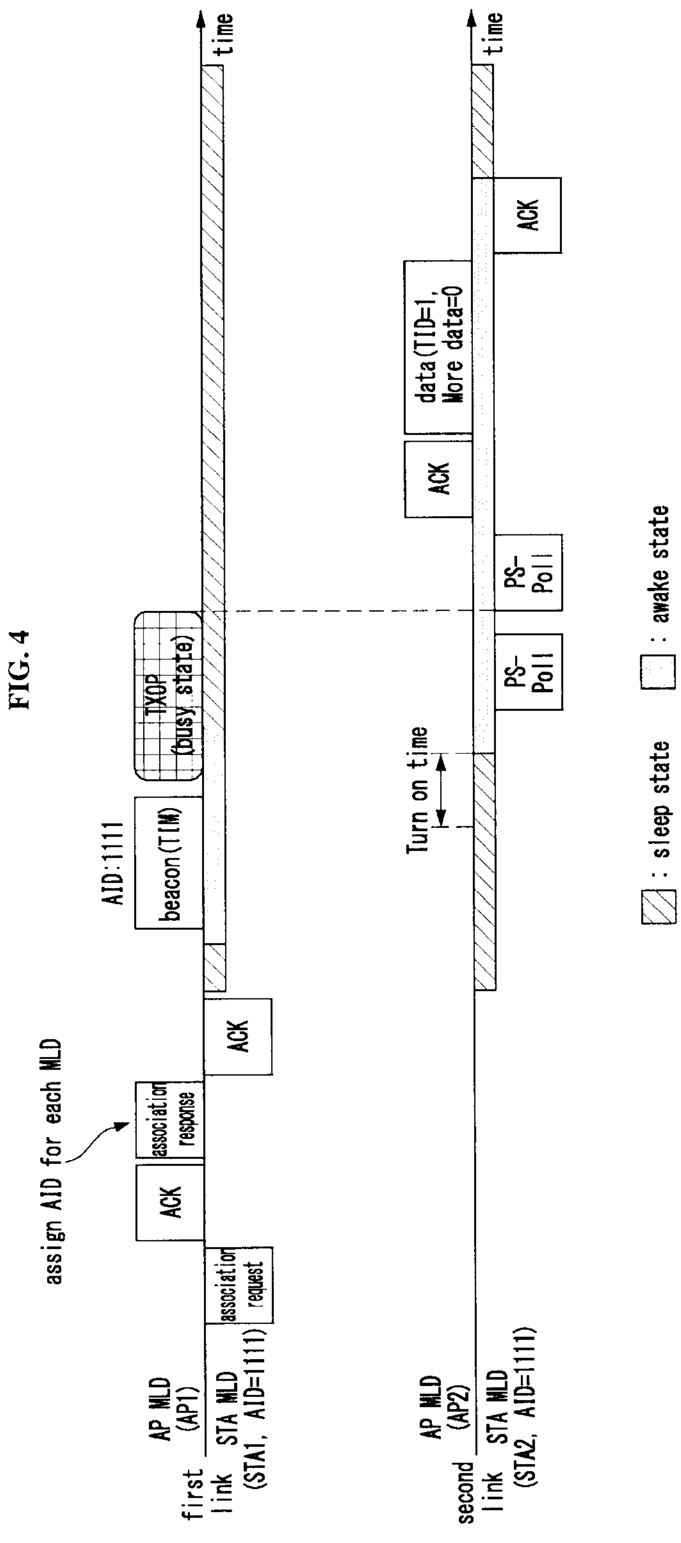
FIG. 4 is a timing diagram illustrating a first embodiment of a power saving method in a wireless LAN system.

FIG. 4 is a timing diagram illustrating a first embodiment of a power saving method in a wireless LAN system.

As shown in FIG. 4, communication using a multi-link may be performed between an AP MLD as a first MLD and a non-AP MLD (e.g., STA MLD) as a second MLD, and a low-power operation may be performed for each link to save power. The low-power operation may refer to a power saving operation. The low-power operation may refer to a transmission/reception operation of data scheduled by the AP MLD. The transmission/reception operation of data scheduled by the AP MLD may be a target wake time (TWT) operation. The STA MLD may perform an association procedure with the AP MLD using one link. Negotiation for the low-power operation may be performed in the association procedure or a low-power operation negotiation procedure. For the negotiation for the low-power operation, a STA1 of the STA MLD may generate an association request frame including information indicating whether to perform (or support) the low-power operation, and the STA1 of the STA MLD may also transmit the association request frame in the first link.

The information indicating whether to perform the low-power operation may refer to a beacon frame monitoring interval. The beacon frame monitoring interval may be set in units of beacon intervals. When the beacon frame monitoring interval is set to 0, this may mean that the low-power operation is not performed. When the beacon frame monitoring interval is set to a value other than 0, this may mean that the low-power operation is performed.

An AP1 of the AP MLD may receive the association request frame of the STA1 in the first link. Based on the information included in the association request frame (e.g., information indicating whether to perform the low-power operation), the AP1 of the AP MLD may identify whether the STA1 of the STA MLD performs the low-power operation. The AP1 of the AP MLD may assign an association identification (AID) for the STA MLD and may transmit an association response frame including the AID (e.g., 1111) in the first link. Since the AID may be assigned for each MLD, the STA1 and STA2 included in the STA MLD may have the same AID. In addition, the association response frame may include information on a beacon interval. The beacon interval may be a beacon transmission periodicity. The STA MLD (e.g., STA1 and/or STA2) may wake up periodically according to the beacon interval and perform a monitoring operation for a beacon frame.

When the STA MLD (e.g., STA1 and/or STA2) supports the low-power operation and the association procedure is completed, all links (e.g., STA1 and STA2 of the STA MLD) may operate in a sleep state. When the STA MLD (e.g., STA1 and/or STA2) supports the low-power operation for transmission and reception of scheduled data, a negotiation procedure for a TWT (e.g., trigger-enabled TWT service period (SP) or restricted TWT (rTWT)) may be performed. The TWT-related procedures may be configured to be performed only in a specific link. For example, the TWT or rTWT-related procedure may be configured to be performed only in a link where the TWT negotiation procedure is performed. In the TWT negotiation procedure, a link where the TWT or rTWT-related procedure is performed may be designated. When the TWT or rTWT is configured, the STA MLD and the AP MLD may transmit and receive frames within a service period (SP), which is a time (e.g., scheduled time) specified by the TWT. Additionally, the TWT or rTWT may be configured as a trigger enabled TWT in which the STA MLD can transmit a data frame only by a trigger frame transmitted by the AP MLD. In embodiments, a link may be interpreted as an AP and/or STA using the link. An operation state (e.g., awake state or sleep state) of one link of the multi-link may transition according to the beacon interval negotiated in the association procedure. For example, the STA1 and STA2 of the STA MLD may operate in a sleep state after the association procedure is completed, and the operation state of the STA1 may transition from the sleep state to the awake state according to the beacon interval negotiated in the association procedure. The STA1 operating in the awake state may receive a beacon frame from the AP1 of the AP MLD by performing a beacon frame monitoring operation.

The STA1 of the STA MLD may identify a value of a bit corresponding to the STA MLD (e.g., AID=1111) in a bitmap of a traffic indication map (TIM) included in the beacon frame. If the value of the bit is set to 0, this may mean that a data unit (e.g., buffered unit (BU)) to be transmitted to the STA MLD does not exist in the AP MLD. If the value of the bit is set to 1, this may mean that a data unit to be transmitted to the STA MLD exists in the AP MLD. The AP MLD may designate links to transmit the BU through the TIM or a separate frame. In this case, the STA MLD may transmit a power saving (PS)-Poll frame, unscheduled-automatic power save delivery (U-APSD) frame, or quality of service (QoS) null frame in one link or a plurality of links among links designated as the links in which the BU is to be transmitted.

When a transmit opportunity (TXOP) is configured for the AP1 to transmit a data frame to another communication node in the first link or for another communication node to transmit a data frame to the AP1, the first link may be in a busy state. Accordingly, the STA1 of the STA MLD may not be able to transmit a PS-Poll frame (or U-APSD frame or QoS null frame) in the first link. In this case, the STA2 of the STA MLD may transmit a PS-Poll frame (or U-APSD frame or QoS null frame) using the second link. In order to receive a beacon frame, the operation state of the STA1 may transition from the sleep state to the awake state, and when it is determined that the first link is in a busy state, the operation state of the STA2 may transition from the sleep state to the awake state for transmission of the PS-Poll frame. In addition, when it is determined that the first link is in a busy state, the operation state of the STA1 may transition from the awake state to the sleep state.

When a frequency band of the first link is adjacent to a frequency band of the second link, an STR operation may be impossible. In other words, a relationship between the first link and the second link may be a non-STR link pair having a non-STR link relationship. In this case, even when the PS-Poll frame is transmitted in the second link, the AP2 of the AP MLD may not be able to transmit an ACK, which is an immediate response to the PS-Poll frame, in the second link due to the busy state of the first link. In other words, while the AP1 of the AP MLD is performing a reception operation in the first link, the PS-Poll frame transmitted in the second link may be received. When the ACK, which is an immediate response, is transmitted, the reception operation in the first link may be stopped. Therefore, when the AP1 of the AP MLD is performing a transmission operation in the first link without transmission of the ACK, which is the immediate response, the PS-Poll frame transmitted in the second link may not be received by the AP2 of the AP MLD. In this case, the ACK, which is the immediate response, cannot be transmitted. When the ACK for the PS-Poll frame is not received, the STA2 of the STA MLD may continuously retransmit the PS-Poll frame in the second link. When the busy state (e.g., TXOP) of the first link ends, the AP2 of the AP MLD may transmit an ACK for the PS-Poll frame of the STA2 in the second link through the second link.

Since the PS-Poll frame is received in the second link and the immediate response is normally transmitted, the AP2 of the AP MLD may transmit a data frame including a data unit stored in a buffer in the second link. The STA2 of the STA MLD may receive the data frame from the AP2 in the second link and may transmit an ACK for the data frame in the second link. The data frame may include a traffic identifier (TID) field and a more data field, the TID field may be set to 1, and the more data field may be set to 0.

When the first link is in the busy state and there is in-device coexistence interference, the PS-Poll frame transmitted in the second link may interfere with the first link. Therefore, a transmission error may occur in the first link. When the first link is in the busy state, and the relationship between the first link and the second link is a non-STR link relationship, the STA1 of the STA MLD may transmit a PS-Poll frame in the first link after the busy state of the first link ends. When a hidden node uses the first link, the STA1 of the STA MLD may determine the state of the first link as an idle state rather than the busy state and may transmit a PS-Poll frame in the first link. In this case, the PS-Poll frame transmitted in the first link may cause a transmission error of another communication node (e.g., hidden node).

Figure 5A:
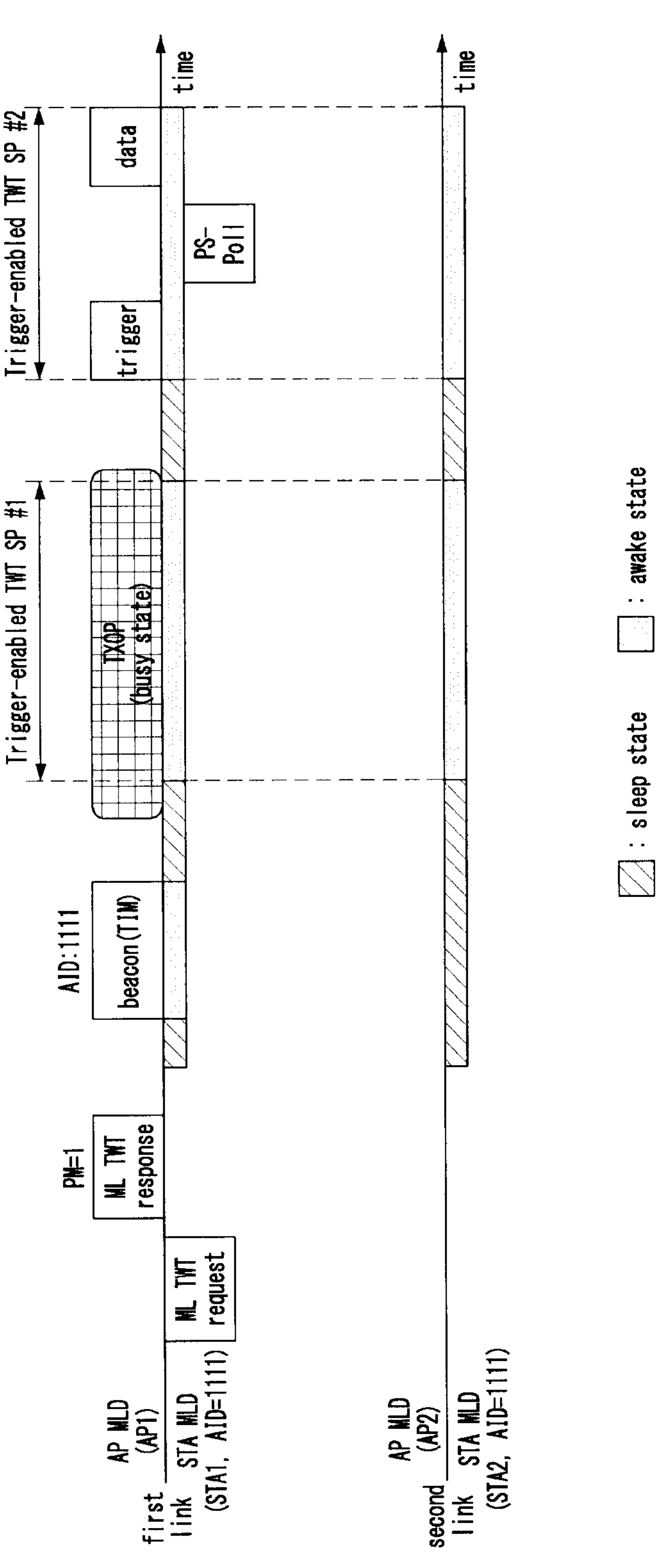
FIG. 5A is a timing diagram illustrating a second embodiment of a power saving method in a wireless LAN system.

FIG. 5A is a timing diagram illustrating a second embodiment of a power saving method in a wireless LAN system.

As shown in FIG. 5A, a low-power operation may be a low-power operation for transmission and reception of scheduled data. When the STA MLD (e.g., STA1 and/or STA2) supports a low-power operation for transmission and reception of scheduled data, the low-power operation may be performed based on a TWT (e.g., trigger-enabled TWT SP or rTWT)). The STA MLD may perform a TWT negotiation procedure with the AP MLD to configure a multi-link TWT. The TWT-related procedure may be configured to be performed only in a specific link. For example, the TWT or rTWT-related procedure may be configured to be performed only in a link where the TWT negotiation procedure is performed. In the TWT negotiation procedure, the link where the TWT or rTWT-related procedure is performed may be designated. When the TWT or rTWT is configured, the STA MLD and the AP MLD may transmit and receive a frame in a SP, which is a time (e.g., scheduled time) specified by the TWT. Additionally, the TWT or rTWT may be configured as a trigger enabled TWT in which the STA MLD can transmit a data frame only by a trigger frame transmitted by the AP MLD. The TWT-related procedure may be performed together when the STA MLD supports a low-power operation in which existence of a BU is indicated through a TIM. The TWT negotiation procedure may be performed between one STA in the STA MLD and one AP in the AP MLD. For example, the STA1 of the STA MLD may perform the TWT negotiation procedure with the AP1 of the AP MLD. In the TWT negotiation procedure, the STA1 of the STA MLD may transmit a multi-link (ML) TWT request frame to the AP1 in the first link. The AP1 of the AP MLD may receive the ML TWT request frame of the STA1 in the first link and may transmit an ML TWT response frame in the first link as a response to the ML TWT request frame. The ML TWT response frame may include information on an ML TWT. The ML TWT request frame may refer to a general TWT request frame including multi-link related information (e.g., link ID bitmap indicating link(s) in which the TWT is operated or restricted TWT information). The ML TWT response frame may refer to a general TWT response frame including multi-link related information (e.g., link ID bitmap indicating link(s) in which the TWT is operated or restricted TWT information).

When the relationship between the first link and the second link is a non-STR link relationship (e.g., non-STR link pair) or when the AP controls the STA's PS-Poll frame transmission due to many hidden nodes, a power management (PM) bit included in the ML TWT response frame may be set to 1. The PM bit set to 1 may mean that communication between the STA and the AP is not performed in a period other than a service period (SP). Alternatively, the PM bit set to 1 may mean that data transmission needs to be terminated before the SP starts so that scheduled communication between the STA and the AP can be performed in the SP.

When the relationship between the first link and the second link is a non-STR link relationship (e.g., non-STR link pair), a non-STR communication terminal (e.g., STA MLD or AP MLD) operating in the non-STR link pair may perform a data transmission/reception operation (e.g., TWT operation) in a TWT SP or a data transmission/reception operation (e.g., rTWT operation) in a rTWT SP. In this case, the AP MLD may match all TWT SPs of the first link and the second link, which are the non-STR link pair (e.g., coincide a start time point and/or end time point of a TWT SP #1 with a start time point and/or end time point of a TWT SP #2). For example, a periodicity of the TWT SP in the first link may be set equal to a periodicity of the TWT SP in the second link, a start time point of the TWT SP in the first link may be set equal to a start time point of the TWT SP in the second link, and an end time point of the TWT SP in the first link may be set equal to an end time point of the TWT SP in the second link. In other words, the TWT SP in the first link may be synchronized with the TWT SP in the second link.

Additionally, in the ML TWT negotiation procedure, the TWT may be configured as a trigger-enabled TWT in which the STA MLD can perform transmission in the TWT SP only by a trigger frame of the AP. Information on the trigger-enabled TWT may be included in the ML TWT response frame, and the trigger-enabled TWT may be configured in the first link. The link where the trigger-enabled TWT is operated may be designated. When the trigger-enabled TWT SP is configured, the STA (e.g., STA1) may transmit a frame (e.g., PS-Poll frame, U-APSD frame, or QoS null frame) when a trigger frame is received from the AP (e.g., AP1) in the trigger-enabled TWT SP. The STA may request data transmission (e.g., BU transmission) by transmitting the PS-Poll frame, U-APSD frame, or QoS null frame. In the low-power operation in which existence of a BU is indicated through a TIM, the AP MLD may transmit a trigger frame for transmission of the PS-Poll frame, U-APSD frame, and/or QoS null frame, and the STA MLD may transmit the PS-Poll frame, U-APSD frame (data frame), and/or QoS null frame as a response frame to the trigger frame.

When the trigger-enabled TWT is configured in the first link and the PM is set to 1, the operation state of the STA1 of the STA MLD may transition from the sleep state to the awake state according to the beacon interval. The STA1 operating in the awake state may receive a beacon frame from the AP1 of the AP MLD and may identify a TIM included in the beacon frame. Here, the AID of the STA MLD (e.g., STA1 and/or STA2) may be set to 1111.

Since the TWT SPs in the first link and the second link, which are a non-STR link pair, are synchronized, if a value of a bit corresponding to the STA MLD in the TIM bitmap is set to 1 (e.g., when a data unit (BU) to be transmitted to the STA MLD is present in the AP MLD), operation states of all STAs of the STA MLD (e.g., STAs in charge of all links) or STAs in links specified by the TIM or a separate frame may transition from the sleep state to the awake state at the identical start time point of the trigger-enabled TWT SPs in the first and second links or before the start time point of the trigger-enabled TWT SPs. All STAs operating in the awake state during the synchronized trigger-enabled TWT SPs in the first link and the second link, which are a non-STR link pair, can transmit frames only by receiving a trigger frame. Accordingly, the corresponding STAs may perform a monitoring operation for receiving a trigger frame. Here, all the STAs may include the STA1 and the STA2.

When the bitmap of the TIM included in the beacon frame indicates that there is a data unit (e.g., BU) to be transmitted to the STA MLD, the relationship between the first link and the second link is a non-STR link relationship (e.g., non-STR link pair), and the first link is in a busy state in the trigger-enabled TWT SP #1 synchronized between the first link and the second link, which are a non-STR link pair, due to a transmission operation or reception operation of the AP1, if the AP1 of the AP MLD performs a transmission operation, a reception operation including channel sensing may not be performed in the second link due to the non-STR link pair. Therefore, since a channel access procedure (e.g., backoff) cannot be performed, a trigger frame may not be transmitted in the second link within the trigger-enabled TWT SP #1 synchronized in the first link and the second link, which are a non-STR link pairs. When the AP1 of the AP MLD performs a reception operation in the trigger-enabled TWT SP #1, a trigger frame transmitted by the AP2 of the AP MLD in the second link within the trigger-enabled TWT SP #1 synchronized in the first link and the second link may interfere with a reception operation of the first link. Accordingly, the trigger frame may not be transmitted through the second link in the trigger-enabled TWT SP #1. Therefore, the STA1 and STA2 may maintain silence in which frame transmission is not performed in the trigger-enabled TWT SP #1 synchronized in the first link and the second link. When the STA MLD performs a transmission/reception operation in one link of the non-STR link pair, a transmission/reception operation in another link of the non-STR link pair may be interfered with by the transmission/reception operation in the one link. In the TWT configuration procedure, the TWT or rTWT may be configured to operate in one link (e.g., first link) of the non-STR link pair. In this case, during the TWT or rTWT SP (e.g., trigger-enabled TWT SP #1) operating in one link (e.g., first link) of the non-STR link pair, the STA MLD may maintain silence in which transmission is not performed in another link (e.g., second link) of the link pair. The STA1 and STA2 may wait until the next trigger-enabled TWT SP #2 to receive a trigger frame. When the first link is in an idle state in the trigger-enabled TWT SP #2, the AP1 of the AP MLD may transmit a trigger frame through the first link in the trigger-enabled TWT SP #2. The STA1 of the STA MLD may receive the trigger frame of the AP1 through the first link in the trigger-enabled TWT SP #2.

In the case of trigger-enabled TWT, when the trigger frame is received from the AP1 within the trigger-enabled TWT SP #2, the STA1 of the STA MLD may transmit a frame (e.g., PS-Poll frame, U-APSD frame (data frame), and/or QoS null frame) through the first link in the trigger-enabled TWT SP #2 in response to the trigger frame. The AP1 of the AP MLD may receive the PS-Poll frame of the STA1 through the first link within the trigger-enabled TWT SP #2, may transmit an ACK as an immediate response thereto, and may transmit a data frame (e.g., data frame including a BU) through the first link within the trigger-enabled TWT SP #2. The data frame may be transmitted after performing a channel access procedure (e.g., backoff) within the trigger-enabled TWT SP #2. The data frame may be configured such that transmission thereof is completed within the trigger-enabled TWT SP #2. The STA1 of the STA MLD may receive the data frame of the AP1 through the first link within the trigger-enabled TWT SP #2.

In the case of a TWT other than trigger-enabled TWT or in the case of a TWT or rTWT in which there is no need to wait for a trigger frame, referring to the embodiment shown in FIG. 5A, the STA1 of the STA MLD may receive a control frame (e.g., RTS or MU-RTS) from the AP1 in the trigger-enabled TWT SP #2. When the control frame is received from the AP1 within the trigger-enabled TWT SP #2, the STA1 of the STA MLD may transmit a control frame (e.g., CTS frame) through the first link in the trigger-enabled TWT SP #2 in response to the received control frame. The AP1 of the AP MLD may receive the control frame, which is the response from the STA1, through the first link in the trigger-enabled TWT SP #2 may and transmit a data frame (e.g., data frame including a BU) after a SIFS elapses from the time point of receiving the control frame. The STA1 of the STA MLD may receive the data frame of the AP1 through the first link in the trigger-enabled TWT SP #2, and transmit a reception response message (e.g., ACK or BA) as an immediate response after a SIFS elapses from the time point of receiving the data frame.

When two links are available, a portion of the data unit (e.g., BU) may be included in a data frame #1, the data frame #1 may be transmitted in the first link, the remaining portion of the data unit may be included in a data frame #2, and the data frame #2 may be transmitted in the second link. Accordingly, transmission of the data unit can be performed quickly. Transmission times of frames transmitted by the AP MLD in the first link and second link may be the same, and reception times of frames received by the AP MLD in the first link and the second link may be the same. The trigger frames transmitted in the first link and the second link may have the same length. A transmission time allocated to the STA1 by the trigger frame transmitted in the first link may be the same as a transmission time allocated to the STA2 by the trigger frame transmitted in the second link. In other words, transmissions of frames transmitted by the STA1 and the STA2 need to be completed at the same time.

Figure 5B:
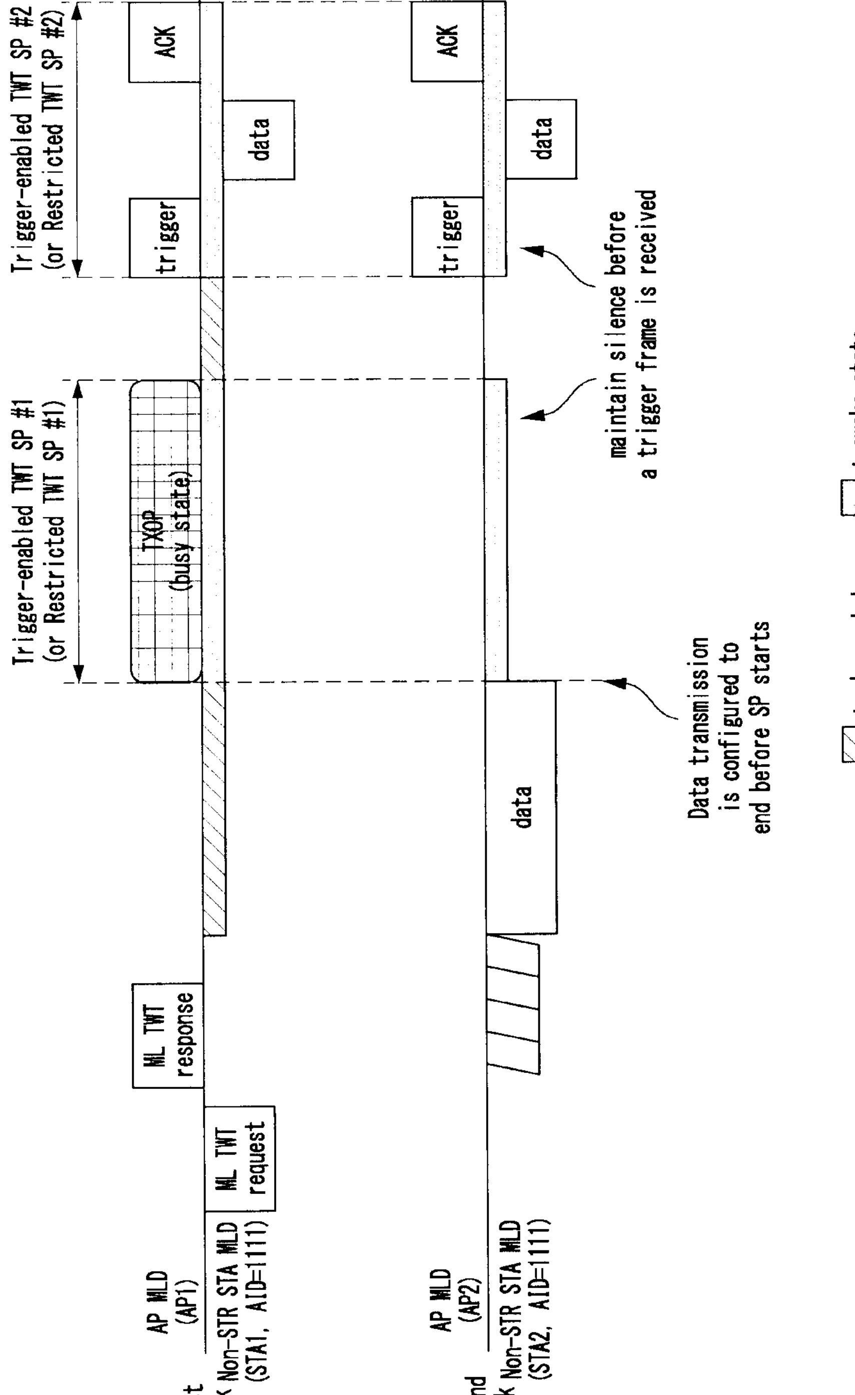
FIG. 5B is a timing diagram illustrating a third embodiment of a power saving method in a wireless LAN system.

FIG. 5B is a timing diagram illustrating a third embodiment of a power saving method in a wireless LAN system.

As shown in FIG. 5A, a low-power operation may be a low-power operation for transmission and reception of scheduled data. When the STA MLD (e.g., STA1 and/or STA2) supports a low-power operation for transmission and reception of scheduled data, the low-power operation may be performed based on a TWT (e.g., trigger-enabled TWT SP or rTWT)). The STA MLD may perform a TWT negotiation procedure with the AP MLD to configure a multi-link TWT. The TWT-related procedure may be configured to be performed only in a specific link. For example, the TWT or rTWT-related procedure may be configured to be performed only in a link where the TWT negotiation procedure is performed. In the TWT negotiation procedure, the link where the TWT or rTWT-related procedure is performed may be designated. When the TWT or rTWT is configured, the STA MLD and the AP MLD may transmit and receive a frame in a SP, which is a time (e.g., scheduled time) specified by the TWT. Additionally, the TWT or rTWT may be configured as a trigger-enabled TWT in which the STA MLD can transmit a data frame only by a trigger frame transmitted by the AP MLD. The TWT negotiation procedure may be performed between one STA in the STA MLD and one AP in the AP MLD. For example, the STA1 of the STA MLD may perform the TWT negotiation procedure with the AP1 of the AP MLD. In the TWT negotiation procedure, the STA1 of the STA MLD may transmit a multi-link (ML) TWT request frame to the AP1 in the first link. The AP1 of the AP MLD may receive the ML TWT request frame of the STA1 in the first link, and may transmit an ML TWT response frame in the first link as a response to the ML TWT request frame. The ML TWT response frame may include information on an ML TWT. The ML TWT request frame may refer to a general TWT request frame including multi-link related information (e.g., link ID bitmap indicating link(s) in which the TWT is operated or restricted TWT information). The ML TWT response frame may refer to a general TWT response frame including multi-link related information (e.g., link ID bitmap indicating link(s) in which the TWT is operated or restricted TWT information).

When the relationship between the first link and the second link is a non-STR link relationship (e.g., non-STR link pair), an ML TWT response frame including a non-STR operation support indicator may be transmitted. The non-STR operation support indicator may be a PM bit. The PM bit set to 1 may mean that non-STR communication between the STA and the AP is performed in the SP. Accordingly, the PM bit set to 1 may mean that data transmission needs to end before the SP starts in the multi-link so that scheduled communication between the STA and the AP can be performed in the SP.

When the relationship between the first link and the second link is a non-STR link relationship (e.g., non-STR link pair), a non-STR communication terminal (e.g., STA MLD or AP MLD) operating in the non-STR link pair may perform a data transmission/reception operation (e.g., TWT operation) in the TWT SP or a data transmission/reception operation (e.g., rTWT operation) in the rTWT SP. In this case, the AP MLD may match all TWT SPs of the first link and the second link which are a non-STR link pair (e.g., coincide a start time point and/or end time point of a TWT SP #1 with a start time point and/or end time point of a TWT SP #2). For example, a periodicity of the TWT SP in the first link may be set equal to a periodicity of the TWT SP in the second link, the start time point of the TWT SP in the first link may be set equal to the start time point of the TWT SP in the second link, and the end time point of the TWT SP in the first link may be set equal to the end time point of the TWT SP in the second link. In other words, the TWT SP in the first link may be synchronized with the TWT SP in the second link.

When a TWT or rTWT operation is performed in one link (e.g., first link) of the non-STR link pair, a data transmission operation performed by the STA (e.g., STA2) of the STA MLD in another link (e.g., second link) of the non-STR link pair needs to be terminated before a start time point of the TWT or rTWT SP of the one link (e.g., first link) of the non-STR link pair. In addition, during the TWT SP or rTWT SP of the one link (e.g., first link) of the non-STR link pair, the STA (e.g., STA2) of the STA MLD may maintain silence in which a transmission operation is not performed in another link (e.g., second link) of the non-STR link pair. The AP MLD may allocate or notify, through the TWT SP or rTWT SP, a period in which the STA of the STA MLD operating in the second link needs to terminate the data transmission operation and maintain silence.

Additionally, in the ML TWT negotiation procedure, the TWT may be configured as a trigger-enabled TWT in which the STA MLD can perform transmission in the TWT SP by a trigger frame of the AP. In addition, when a data transmission/reception operation is performed in one link (e.g., first link) of the non-STR link pair during the TWT or rTWT SP, a data transmission/reception operation may not be performed in the same period of another link (e.g., second link) of the non-STR link pair. Accordingly, in order for the STA MLD to operate in the TWT or rTWT SP, the AP MLD may configure trigger-enabled TWTs or rTWTs having the same SP in the first link and the second link, which are the non-STR link pair, to the STA MLD.

An STA MLD operating as a non-STR STA MLD in the non-STR link pair may negotiate to operate the TWT or rTWT in the first link through the ML TWT negotiation procedure with the AP MLD. Data frames may be configured such that transmission operations of the data frames are terminated in the first link and the second link before a start time point of the TWT SP in the first link. In the first link where the TWT or rTWT operates, up to transmission of ACK or block Ack (BA), which is an immediate response to the data frame, may be completed before the start time point of the TWT or rTWT SP. The second link may be a non-STR link pair with the first link, and the TWT or rTWT may not operate in the second link. In this case, during the TWT or rTWT SP in the second link, the AP2 may transmit an immediate response to the data frame of the STA2 according to a transmission time of the trigger frame in the first link. Accordingly, in the second link, the STA2 may complete the data transmission operation before the start time point of the TWT or rTWT SP of the first link. In other words, the data frame may be configured such that the data transmission operation is completed before the start time point of the TWT or rTWT SP of the first link.

When the STA MLD is an eMLSR or eMLMR terminal, an end time point of the data frame to be transmitted in the second link may be determined by considering a time required for transitioning one radio to the first link in the eMLSR or eMLMR terminal. The data transmission operation (e.g., the data transmission operation includes an ACK or BA reception operation for the data) may be completed so that the radio can transition to the first link before the start time point of the SP. In other words, the eMLSR or eMLMR terminal may receive the frame received in the first link through a plurality of spatial streams by transitioning all radios (e.g., radios operating in the second link) to the first link where the TWT or rTWT operates before the start time point of the SP of the TWT or rTWT of the first link.

An STA MLD operating as a non-STR STA MLD in the non-STR link pair may negotiate to operate the TWT or rTWT in the first link through the ML TWT negotiation procedure with the AP MLD. The TWT or rTWT having the same SP as the first link may be configured to operate in the second link, which is another link of the non-STR link pair. In the case of the non-STR link pair, the TWT or rTWT of the second link may be implicitly configured when the TWT or rTWT of the first link is configured. Even when configuration-related parameters of the second link TWT are not configured in the TWT configuration procedure, the TWT or rTWT of the second link may be implicitly configured.

Information on the trigger-enabled TWT may be included in the ML TWT response frame, and the trigger-enabled TWT may be configured in the first link. The link where the trigger-enabled TWT operates may be designated. When a trigger-enabled TWT SP is configured, the STA (e.g., STA1) may transmit a frame (e.g., data frame) when a trigger frame is received from the AP (e.g., AP1) in the trigger-enabled TWT SP. When the trigger-enabled TWT is configured in the first link and the PM is set to 1, the operation state of the STA1 of the STA MLD may be transitioned to a transmission/reception state of data scheduled with the AP MLD in the TWT or rTWT SP. All STAs operating in non-STR in the TWT or rTWT SP and having TWT or rTWT configuration may transmit a frame when a trigger frame is received. Accordingly, the corresponding STAs may perform a monitoring operation for receiving a trigger frame. In other words, if a trigger frame is not received, the STA may be silent without performing a transmission operation in the TWT or rTWT SP. If the trigger-enabled TWT is configured in the TWT or rTWT SP of one link of the non-STR link pair, the STA (e.g., STA2) of the STA MLD operating in another link of the non-STR link pair may be silent without performing a transmission operation in the second link during the same TWT or rTWT SP as the first link even when execution of the TWT or rTWT operation is not configured. Alternatively, it may be interpreted that the trigger-enabled TWT is implicitly configured in the second link as in the first link, and the STA2 of the STA MLD may perform data transmission when a trigger frame is received in the second link.

When the trigger frame is received from the AP1, the STA1 of the STA MLD may transmit a frame (e.g., data frame) as a response to the trigger frame through the first link in the trigger-enabled TWT SP #2. The STA2 of the STA MLD that has not received the trigger frame from the AP2 in the second link may be silent during the trigger-enabled TWT SP #2. The AP1 of the AP MLD may receive the data frame of the STA1 through the first link in the trigger-enabled TWT SP #2 and may transmit an ACK, which is an immediate response thereto.

When both links, which are a non-STR link pair, are available, the trigger frames may be simultaneously transmitted in the first link and the second link because synchronized transmissions should be performed. Time points of completing the transmissions of the trigger frames may be the same. Times allocated through the trigger frames in the first link and the second link may be the same, and the STA1 and STA2 may complete the transmissions at the same time. Each of the AP1 and AP2 may transmit an immediate response (e.g., ACK or BA) after a SIFS elapses from the time point of receiving the data frame. A transmission time point and a completion time point of the immediate response of the AP1 may be the same as a transmission time point and a completion time point of the immediate response of the AP2. In other words, the transmissions of the immediate responses on the first link and the second link may be synchronized.

Figure 6:
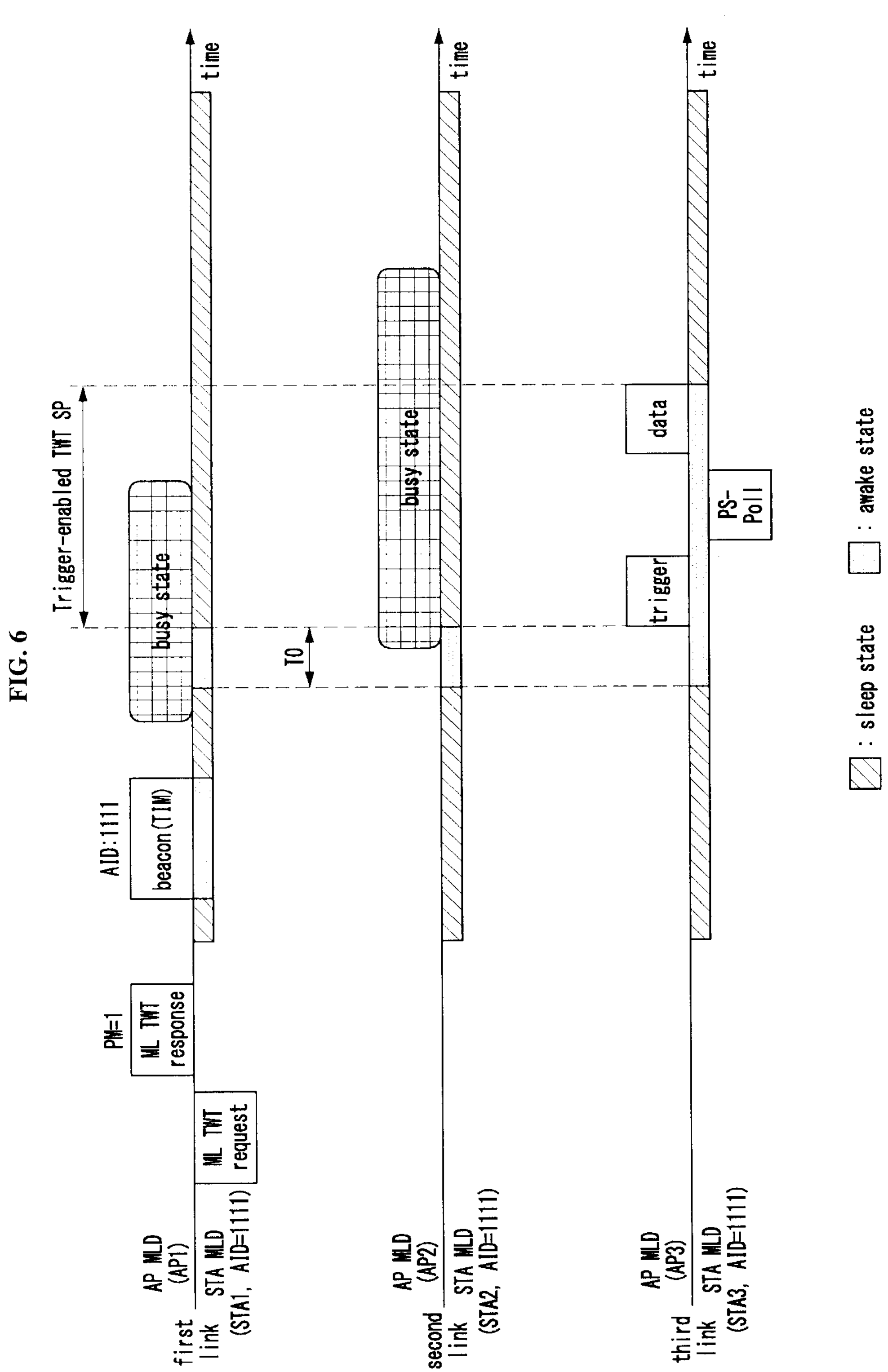
FIG. 6 is a timing diagram illustrating a fourth embodiment of a power saving method in a wireless LAN system.

FIG. 6 is a timing diagram illustrating a fourth embodiment of a power saving method in a wireless LAN system.

As shown in FIG. 6, a low-power operation may be performed based on a TWT. The STA MLD may perform a TWT negotiation procedure with the AP MLD to configure a multi-link TWT. The TWT negotiation procedure may be performed when the STA MLD supports a low-power operation or a low-power operation for transmission and reception of scheduled data. The TWT negotiation procedure may be performed in one link of the multi-link. For example, in the first link, the STA1 of the STA MLD may perform the TWT negotiation procedure with the AP1 of the AP MLD. In the TWT negotiation procedure, an ML TWT request frame and an ML TWT response frame may be exchanged, and a trigger-enabled TWT SP may be configured by the TWT negotiation procedure.

The STA1 operating in the first link where the TWT negotiation procedure has been performed may perform a monitoring operation for reception of a beacon frame of the AP1 according to a beacon interval (e.g., beacon transmission periodicity). When a beacon frame is received from the AP1 of the AP MLD, the STA1 of the STA MLD may identify whether data to be transmitted to the STA1 exists in the AP1 by identifying a TIM (e.g., bitmap) included in the beacon frame. When an AID of the STA MLD is 1111, and a bit corresponding to the AID=1111 is set to 1 in a partial virtual bitmap of the TIM, the STA1 of the STA MLD may operate in the awake state at a start time point (or before the start time point) of the trigger-enabled TWT SP configured by the TWT negotiation procedure or a trigger-enabled TWT SP indicated by the beacon frame and preform a monitoring operation for a trigger frame in the trigger-enabled TWT SP.

When links available during the trigger-enabled TWT SP are not known, in order to monitor all links, operation states of all STAs (e.g., STA1, STA2, and STA3) of the STA MLD may transition from the sleep state to the awake state before T0 from a start time point of the trigger-enabled TWT SP. All STAs (e.g., STA1, STA2, and STA3) of the STA MLD may perform the monitoring operation during T0. T0 may be a time period during which link monitoring is performed, and each of all the STAs (e.g., STA1, STA2, and STA3) of the STA MLD may identify whether a link is idle or busy during T0. T0 may be set to a time within [distributed coordination function (DCF) interframe space (DIFS)+maximum value of backoff counter]. The operation states of STAs (e.g., STA1 and STA2) operating in links that are in the busy state during T0 may transition from the awake state to the sleep state after T0. Alternatively, T0 may be the start time point of the trigger-enabled TWT SP.

When the third link is in an idle state in the trigger-enabled TWT SP, the AP3 of the AP MLD may transmit a trigger frame in the third link. The STA3 of the STA MLD may receive the trigger frame of the AP3 through the third link in the trigger-enabled TWT SP. When the trigger frame is received, the STA3 of the STA MLD may transmit a PS-Poll frame, U-APSD frame, or QoS null frame through the third link in the trigger-enabled TWT SP. The AP3 of the AP MLD may receive the PS-Poll frame, U-APSD frame, or QoS null frame of the STA3 through the third link in the trigger-enabled TWT SP. When the PS-Poll frame, U-APSD frame, or QoS null frame of the STA3 is received, the AP3 of the AP MLD may determine that the third link is available. In this case, the AP3 of the AP MLD may transmit a data frame (e.g., data frame including a BU) through the third link in the trigger-enabled TWT SP. The STA3 of the STA MLD may receive the data frame of the AP3 through the third link in the trigger-enabled TWT SP.

Alternatively, the link where the TWT negotiation procedure has been performed may be monitored before T0 from the start time point of the trigger-enabled TWT SP, and the corresponding link may be in a busy state. In this case, the operation states of STAs in charge of other links may transition from the sleep state to the awake state, and the corresponding STAs may monitor the links in the trigger-enabled TWT SP. If the link where the TWT negotiation procedure has been performed is busy at the start time point of the trigger-enabled TWT SP, the AP MLD may transmit a trigger frame through a link in which a channel access operation succeeds first among the links available for the STA MLD.

Figure 7:
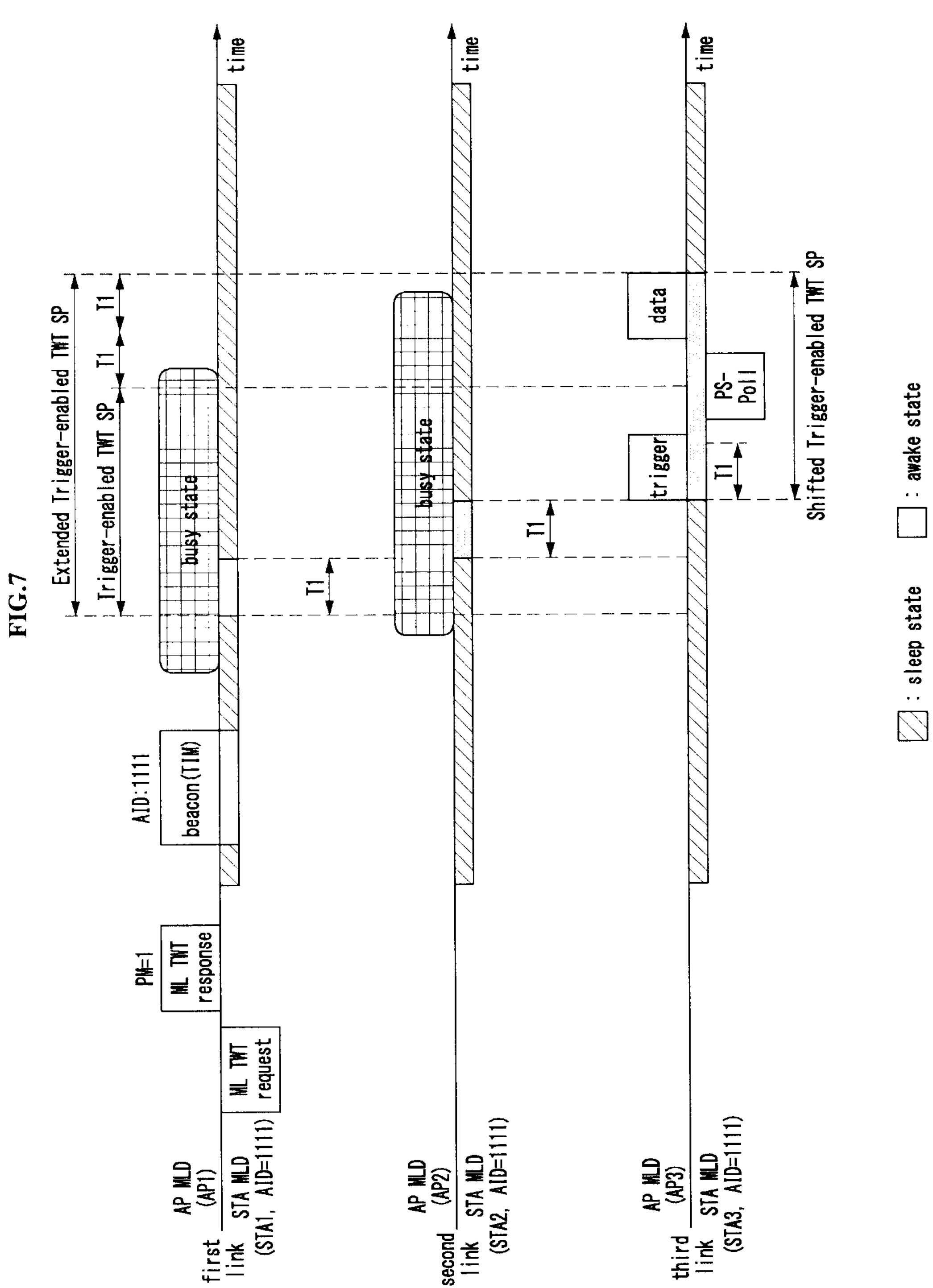
FIG. 7 is a timing diagram illustrating a fifth embodiment of a power saving method in a wireless LAN system.

FIG. 7 is a timing diagram illustrating a fifth embodiment of a power saving method in a wireless LAN system.

As shown in FIG. 7, a low-power operation may be performed based on a TWT. The STA MLD may perform a TWT negotiation procedure with the AP MLD to configure a multi-link TWT. The TWT negotiation procedure may be performed in one link of the multi-link. For example, in the first link, the STA1 of the STA MLD may perform the TWT negotiation procedure with the AP1 of the AP MLD. In the TWT negotiation procedure, an ML TWT request frame and an ML TWT response frame may be exchanged, and a trigger-enabled TWT SP may be configured by the TWT negotiation procedure.

The STA1 operating in the first link where the TWT negotiation procedure has been performed may perform a monitoring operation for reception of a beacon frame of the AP1 according to a beacon interval (e.g., beacon transmission periodicity). When a beacon frame is received from the AP1 of the AP MLD, the STA1 of the STA MLD may identify whether data to be transmitted to the STA1 exists in the AP1 by identifying a TIM (e.g., bitmap) included in the beacon frame. When an AID of the STA MLD is 1111, and a bit corresponding to the AID=1111 is set to 1 in a partial virtual bitmap of the TIM, the STA1 of the STA MLD may operate in the awake state at a start time point (or before the start time point) of the trigger-enabled TWT SP configured by the TWT negotiation procedure or a trigger-enabled TWT SP indicated by the beacon frame and may perform a monitoring operation for a trigger frame in the trigger-enabled TWT SP.

When links available during the trigger-enabled TWT SP are not known, the STA MLD may sequentially monitor each link during T1 from the start time point of the trigger-enabled TWT SP. T1 may be set to a time within [DIFS+maximum value of backoff counter]. T1 may be a time period. For example, if a link is busy during T1, the STA MLD may monitor another link during the next T1. When the state of the link is changed from the busy state to the idle state during T1, the STA MLD may additionally perform a monitoring operation for the corresponding link during T2. T2 may be set to a time within [DIPS+maximum value of backoff counter]. If the state of the corresponding link is changed from the idle state to the busy state during T2, the STA MLD may perform a monitoring operation for another link during T1.

The length of the trigger-enabled TWT SP may be increased by a time of performing the link monitoring operations. When the monitoring operation is performed during T1 in each of the first link and the second link, the length of the trigger-enabled TWT SP may increase by [T1+T1]. If a specific link is monitored during T2, the length of the trigger-enabled TWT SP may be further increased by T2.

When the third link is in an idle state in the trigger-enabled TWT SP, the AP3 of the AP MLD may transmit a trigger frame in the third link. The STA3 of the STA MLD may receive the trigger frame of the AP3 through the third link in the trigger-enabled TWT SP (e.g., extended trigger-enabled TWT SP). When the trigger frame is received, the STA3 of the STA MLD may transmit a PS-Poll frame, U-APSD frame, or QoS null frame through the third link in the trigger-enabled TWT SP (e.g., extended trigger-enabled TWT SP). The AP3 of the AP MLD may receive the PS-Poll frame, U-APSD frame, or QoS null frame of the STA3 through the third link in the trigger-enabled TWT SP (e.g., extended trigger-enabled TWT SP). When the PS-Poll frame, U-APSD frame, or QoS null frame of the STA3 is received, the AP3 of the AP MLD may determine that the third link is available. In this case, the AP3 of the AP MLD may transmit a data frame (e.g., data frame including a BU) through the third link in the trigger-enabled TWT SP (e.g., extended trigger-enabled TWT SP). The STA3 of the STA MLD may receive the data frame of the AP3 through the third link in the trigger-enabled TWT SP (e.g., extended trigger-enabled TWT SP).

Figure 8:
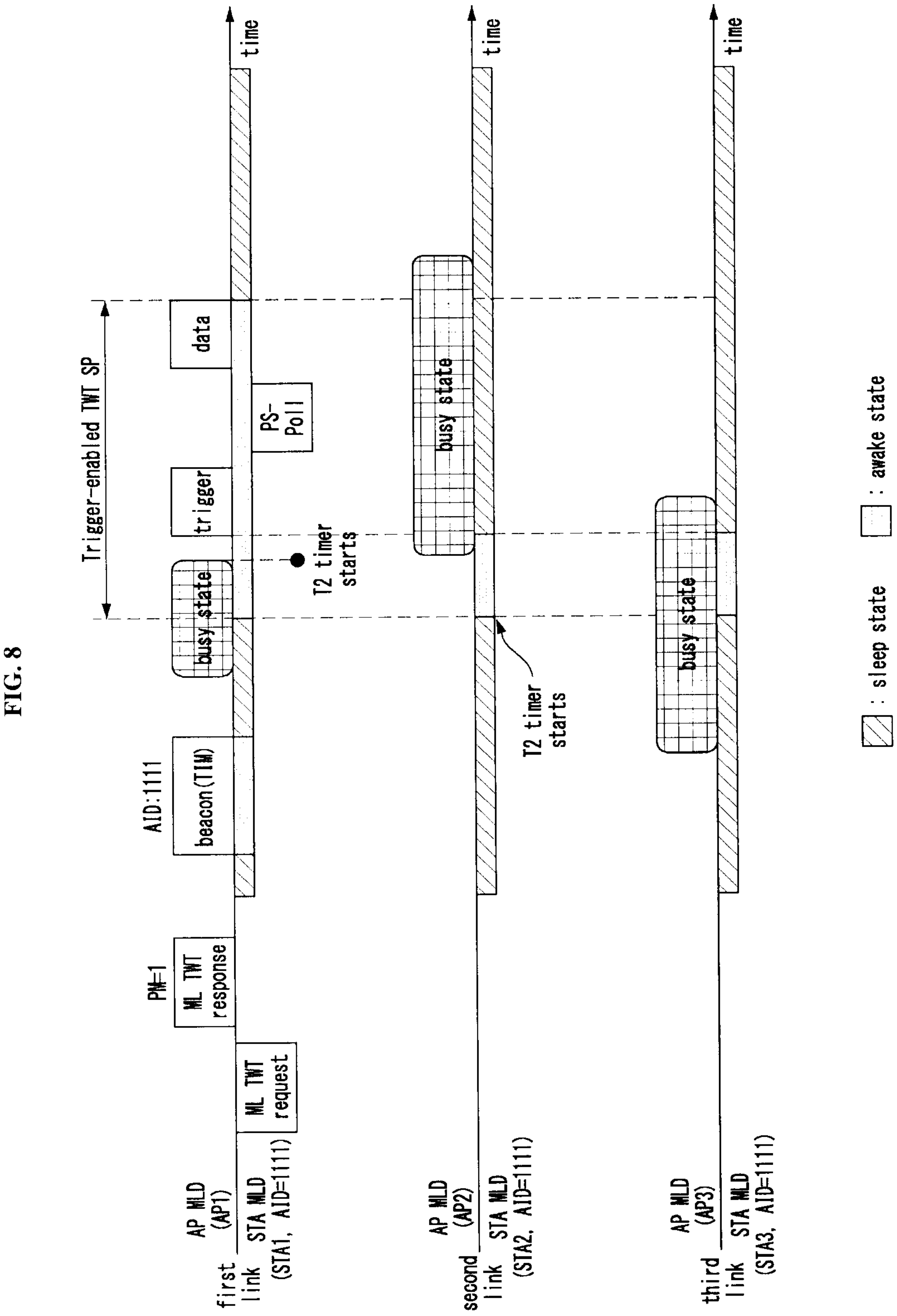
FIG. 8 is a timing diagram illustrating a sixth embodiment of a power saving method in a wireless LAN system.

FIG. 8 is a timing diagram illustrating a sixth embodiment of a power saving method in a wireless LAN system.

As shown in FIG. 8, a low-power operation may be performed based on a TWT. The STA MLD may perform a TWT negotiation procedure with the AP MLD to configure a multi-link TWT. The TWT negotiation procedure may be performed in one link of the multi-link. For example, in the first link, the STA1 of the STA MLD may perform the TWT negotiation procedure with the AP1 of the AP MLD. In the TWT negotiation procedure, an ML TWT request frame and an ML TWT response frame may be exchanged, and a trigger-enabled TWT SP may be configured by the TWT negotiation procedure.

The STA1 operating in the first link where the TWT negotiation procedure has been performed may perform a monitoring operation for reception of a beacon frame of the AP1 according to a beacon interval (e.g., beacon transmission periodicity). When a beacon frame is received from the AP1 of the AP MLD, the STA1 of the STA MLD may identify whether data to be transmitted to the STA1 exists in the AP1 by identifying a TIM (e.g., bitmap) included in the beacon frame. When an AID of the STA MLD is 1111, and a bit corresponding to the AID=1111 is set to 1 in a partial virtual bitmap of the TIM, the STA1 of the STA MLD may operate in the awake state at a start time point (or before the start time point) of the trigger-enabled TWT SP configured by the TWT negotiation procedure or a trigger-enabled TWT SP indicated by the beacon frame and may perform a monitoring operation for a trigger frame in the trigger-enabled TWT SP.

When links available during the trigger-enabled TWT SP are not known, the STA MLD may monitor all links for a preset time from the start time point of the trigger-enabled TWT SP. When a trigger frame is received from the AP MLD within the preset time, operation state(s) of STA(s) in charge of link(s) other than a link in which the corresponding trigger frame is received may transition from the awake state to the sleep state. For example, when a trigger frame is received in the first link, the operation states of the STA2 in charge of the second link and the STA3 in charge of the third link may transition from the awake state to the sleep state. That is, the STA2 and the STA3 may operate in a power saving state.

The preset time may be T2 (e.g., a time corresponding to a T2 timer). An STA MLD (e.g., each STA) may start the T2 timer when a link is in an idle state within the trigger-enabled TWT SP. When the state of the link is changed from the idle state to the busy state, the STA MLD (e.g., each STA) may stop the T2 timer. The state(s) of STA(s) in link(s) other than a link in which the T2 timer expires first may transition to a power saving state. An operation method according to the T2 timer may be performed as follows.

Figure 9:
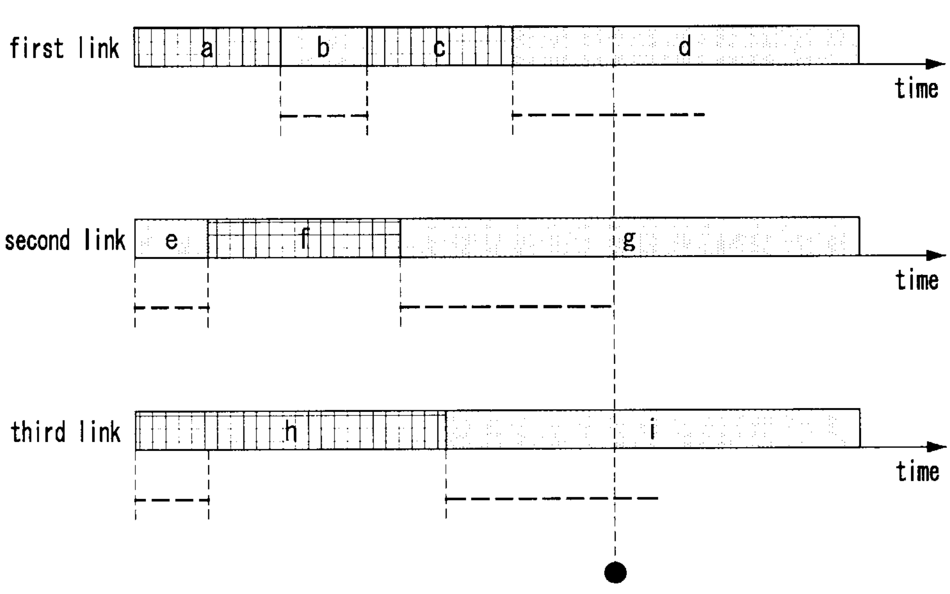
FIG. 9 is a timing diagram illustrating a first embodiment of an operation method according to a T2 timer in a wireless LAN system.

FIG. 9 is a timing diagram illustrating a first embodiment of an operation method according to a T2 timer in a wireless LAN system.

As shown in FIG. 9, in the first link, the STA1 may start a T2 timer at a start time point of a period b (e.g., period in an idle state) and may terminate (or stop) the T2 timer at a start time point of a period c (e.g., period in a busy state). Since the state of the first link transitions from the busy state to the idle state in a period d, the STA1 may start the T2 timer at a start time point of the period d (e.g., period in the idle state). If the idle state in the first link lasts for a time corresponding to the T2 timer, the T2 timer may expire.

In the second link, the STA2 may start a T2 timer from a start time point of a period e (e.g., period in an idle state) and may terminate the T2 timer at a start time point of a period f (e.g., period in a busy state). Since the state of the first link transitions from the busy state to an idle state in a period g, the STA2 may start the T2 timer at a start time point of the period g (e.g., period in the idle state). If the idle state of the second link lasts for a time corresponding to the T2 timer, the T2 timer may expire.

In the third link, the STA3 may start a T2 timer at a start time point of a period i (e.g., period in an idle state). If the idle state of the third link lasts for a time corresponding to the T2 timer, the T2 timer may expire.

Referring again to FIG. 8, the STA MLD may transition states of STAs to a power saving state in all links excluding a link where the T2 timer expires at a time point when the T2 timer expires first. If a trigger frame is received while the T2 timer is running, the STA MLD may terminate the T2 timer. In this case, the T2 timer may be treated as normally terminated. For example, since the trigger frame is received while the T2 timer is operating in the first link, the T2 timer may be terminated. In this case, states of STAs in links other than the first link may transition to a power saving state.

Even when the T2 timer is normally terminated due to reception of the trigger frame in the first link, states of STAs in links other than the first link may not transition to a power saving state according to information included in the trigger frame. In other words, the state of the STA in each of the second link and the third link may maintain a normal state (e.g., awake state).

Even when a TIM is received, the STA may not know a TID of data (e.g., BU) to be received from the AP. The TID may be determined by TID-to-link mapping, and link(s) to be received may be identified based on the determined TID. Accordingly, the trigger frame may additionally include information indicating the TID of data (e.g., BU). The STA may identify the TID indicated by the trigger frame and report the TID of data (e.g., BU) to be received from the AP to the MLD. The MLD may receive information of the TID from the STA and maintain the STA(s) in charge of the link(s) mapped to the corresponding TID in a normal state. According to this operation, the data (e.g., BU) may be received from the AP through a plurality of links.

The embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those having ordinary skill in the art.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. A method for operating a device including a first station (STA) and a second STA and supporting multi-links, the method comprising:

performing, by the first STA affiliated with the device, a negotiation procedure for a restricted target wake time (R-TWT) service period (SP) on a first link of a non-simultaneous transmit and receive (NSTR) link pair;

obtaining, by the second STA affiliated with the device, transmission opportunity (TXOP) in a second link of the NSTR link pair;

performing, by the second STA affiliated with the device, first communication on the second link; and terminating, by the second STA affiliated with the device, the first communication, before a start of the R-TWT SP on the first link, wherein an interval between an end time of the first communication and a start time of the R-TWT SP is 0.

2. The method of claim 1, wherein the device includes a second STA operating in the second link, and wherein the second STA does not perform third communication on the second link, during a period corresponding to the R-TWT SP.

3. The method of claim 1, wherein, when the device supports an enhanced multi-link single radio (eMLSR) or an enhanced multi-link multi-radio (eMLMR), an end time of the first communication is determined based on a transition time to the first link.

4. The method of claim 1, wherein another R-TWT SP is configured by the second STA on the second link, and wherein the R-TWT SP overlaps the another R-TWT SP.

5. The method of claim 1, wherein the device includes a first station (STA) operating for the first link, and wherein the R-TWT SP is configured by an associated access point (AP) for the first STA.

6. A device including a first station (STA) and a second STA and supporting multi-links, the device comprising:

a processor configured to cause the first STA and the second STA to:

perform, by the first STA affiliated with the device, a negotiation procedure for a restricted target wake time (R-TWT) service period (SP) on a first link of a non-simultaneous transmit and receive (NSTR) link pair;

obtain, by the second STA affiliated with the device, transmission opportunity (TXOP) in a second link of the NSTR link pair;

perform, by the second STA affiliated with the device, first communication on the second link; and terminate, by the second STA affiliated with the device, the first communication, before a start of the R-TWT SP on the first link, wherein an interval between an end time of the first communication and a start time of the R-TWT SP is 0.

7. The device of claim 6, wherein the device includes a second STA operating in the second link, and wherein the second STA does not perform third communication on the second link, during a period corresponding to the R-TWT SP.

8. The device of claim 6, wherein, when the device supports an enhanced multi-link single radio (eMLSR) or an enhanced multi-link multi-radio (eMLMR), an end time of the first communication is determined based on a transition time to the first link.

9. The device of claim 6, wherein another R-TWT SP is configured by the second STA on the second link, and wherein the R-TWT SP overlaps the another R-TWT SP.

* * * * *